United States Patent [19]

Christ

[11] 3,994,367

[45] Nov. 30, 1976

[54] HYDROSTATICALLY LUBRICATED BEARING

[75] Inventor: Alfred Christ, Zurich, Switzerland

[73] Assignee: Escher Wyss Limited, Zurich, Switzerland

[22] Filed: June 19, 1975

[21] Appl. No.: 588,582

[30] Foreign Application Priority Data

June 27, 1974 Switzerland.................. 8839/74

[52] U.S. Cl. ........................... 184/5; 308/9; 308/72; 29/116 AD; 184/6.22
[51] Int. Cl.² .................................. F16N 1/00
[58] Field of Search .... 29/113 AD, 116 R, 116 AD, 29/126; 308/20, 208, 9, 37, 72, 78, 121, 122; 184/7 R, 5, 24, 611; 100/171

[56] References Cited
UNITED STATES PATENTS

| | | | |
|---|---|---|---|
| 2,953,291 | 9/1960 | Huck | 29/126 |
| 3,119,639 | 1/1964 | Adams | 308/9 |
| 3,744,858 | 7/1973 | Weischel | 308/5 R |
| 3,791,703 | 2/1974 | Ifield | 308/73 |
| 3,802,044 | 4/1974 | Spillmann | 29/113 |

Primary Examiner—Richard C. Pinkham
Assistant Examiner—Marvin Siskind
Attorney, Agent, or Firm—Pennie & Edmonds

[57] ABSTRACT

Bearing apparatus to position a smooth-surfaced machine member from another member for relative motion of the two members parallel to that surface while permitting small relative motions thereof normally of that surface in response to changes in applied stress pressing the members together normally of that surface comprises a hollow piston sealingly received in a cylindrical cavity in that other member and with its crown to the exterior of the cavity, the piston having a small-bore passage through the crown between its end faces inside and outside the cavity, a compression spring disposed inside the piston and engaged between the underside of the crown and an adjustable abutment on the other member inside the cavity, a pump to deliver hydraulic fluid at a constant time rate to the cavity, and means to regulate the temperature of the fluid so delivered.

7 Claims, 3 Drawing Figures

HYDROSTATICALLY LUBRICATED BEARING

The present invention relates to hydrostatically lubricated bearing devices for the full fluid-film lubricated support with respect to each other of machine parts or members which may shift with respect to each other, for example in their spacing or separation, as well as in the linear, rotational, or other relative motion occurring at the fluid film.

Hydrostatically lubricated bearings have been heretofore proposed in various forms. For example, Swiss Pat. No. 317,617 shows what may be called fixed hydrostatic bearings which are fed with hydraulic fluid at a constant time rate. These bearings may be called fixed because the parts in question move past each other at a separation which, in terms of the gross dimensions of the parts, is constant, one part being supported on the other part with hydrostatic lubrication being provided between the two by means of oil delivered under pressure to shallow cavities or pockets cut or otherwise formed in the bearing surface of one of the parts. These bearings have a very steeply falling, essentially vertical characteristic curve relating clearance to load-carrying capacity, i.e. to the force stressing the parts together. That is, when the bearing surfaces of the two parts move away from each other, normally to those surfaces, the increase in clearance causes a sudden and drastic decline in oil pressure within the hydrostatic bearing, so that the force stressing the parts together, normally of their bearing surfaces which can exist at such a clearance is drastically lower than the comparable force which can exist when the clearance is smaller.

There also exist what may be termed follow-up type hydrostatically lubricated bearings as shown for example in U.S. Pat. No. 3,802,044. Such a bearing includes one or more pistons, movably received in cylindrical bores in one of the machine members, the outer face of the piston having hydrostatic bearing oil-receiving cavities or pockets formed therein. Oil is supplied at constant, controlled pressure to the underside of the piston and passes via capillary bores through the piston to those pockets, past which the mating machine member moves on a cushion of oil. The pistons are free to move in their bores, following changes in the separation of the two members which are large compared to the thickness of the oil cushion and hence to the clearance between the outer face of the piston and the part which moves past it. In these bearings, the load-carrying capacity is independent of the separation of the members.

It is an object of the invention to provide a hydrostatic bearing which has a falling characteristic curve relating clearance to load-carrying capacity, i.e. one in which, when the bearing surfaces approach each other, the force required to hold them at such reduced clearance increases. Full hydrostatic lubrication is thus insured.

The bearing of the invention includes one or more pistons, received in cylindrical bores of one of the parts between which the bearing is provided. Oil or other hydraulic fluid is supplied under pressure to the underside of these pistons, the outer ends of the pistons bearing against the other of those parts via a hydrostatic oil cushion formed by oil which passes through the piston, via constricted passages, to hydrostatic bearing pockets or cavities in the outer face of the piston. A compression spring is provided between the piston and the machine part in which the piston is received.

By the provision of this spring there is achieved, in a very simple manner, an increase in the load-supporting capacity of the bearing, consistently with maintenance of hydrostatic lubrication, as the separation of the two machine parts declines.

A particularly advantageous effect is achieved by providing that the source of hydraulic fluid shall deliver a constant volume per unit time.

In this way, the increase provided by the spring in the stress normal to the bearing surfaces required to hold the machine parts at a reduced separation may be greatly amplified over the increase which would be provided by the spring alone. Thus a relatively weak spring, of high compliance, permits the obtainment of a very stiff bearing.

The source of hydraulic fluid may be provided with means to hold constant the temperature and thereby the viscosity of that fluid. In this way a perturbing factor is eliminated which otherwise would affect the amplification factor.

In one embodiment of the invention, in which the piston is supported in a cylindrical cavity, the spring can itself be disposed in that cylindrical cavity. This results in a simplified construction.

The spring may bear against the machine part in which this piston-guiding cavity is formed at a surface which is adjustable axially of the direction of piston motion.

The piston may be supported in its cylinder in a manner to seal off the space beneath the piston but which permits angular motions of the piston so that its outer face may follow inclinations of the machine part which the piston is supporting. In such a case the piston is advantageously formed to receive the stress of the spring at a spherical surface which in operation is made to be substantially at the height of the seal between the piston and its cylinder.

Advantageously a hydraulic damping device may be provided between the piston and the machine part which supports it. In this way, simple means suffice greatly to increase the damping effect of the support mechanism.

BRIEF DESCRIPTION OF THE DRAWING

The invention will now be further described in terms of a number of presently preferred exemplary embodiments and with reference to the accompanying drawings in which.

DESCRIPTION OF PREFERRED EMBODIMENTS

Figure 1:
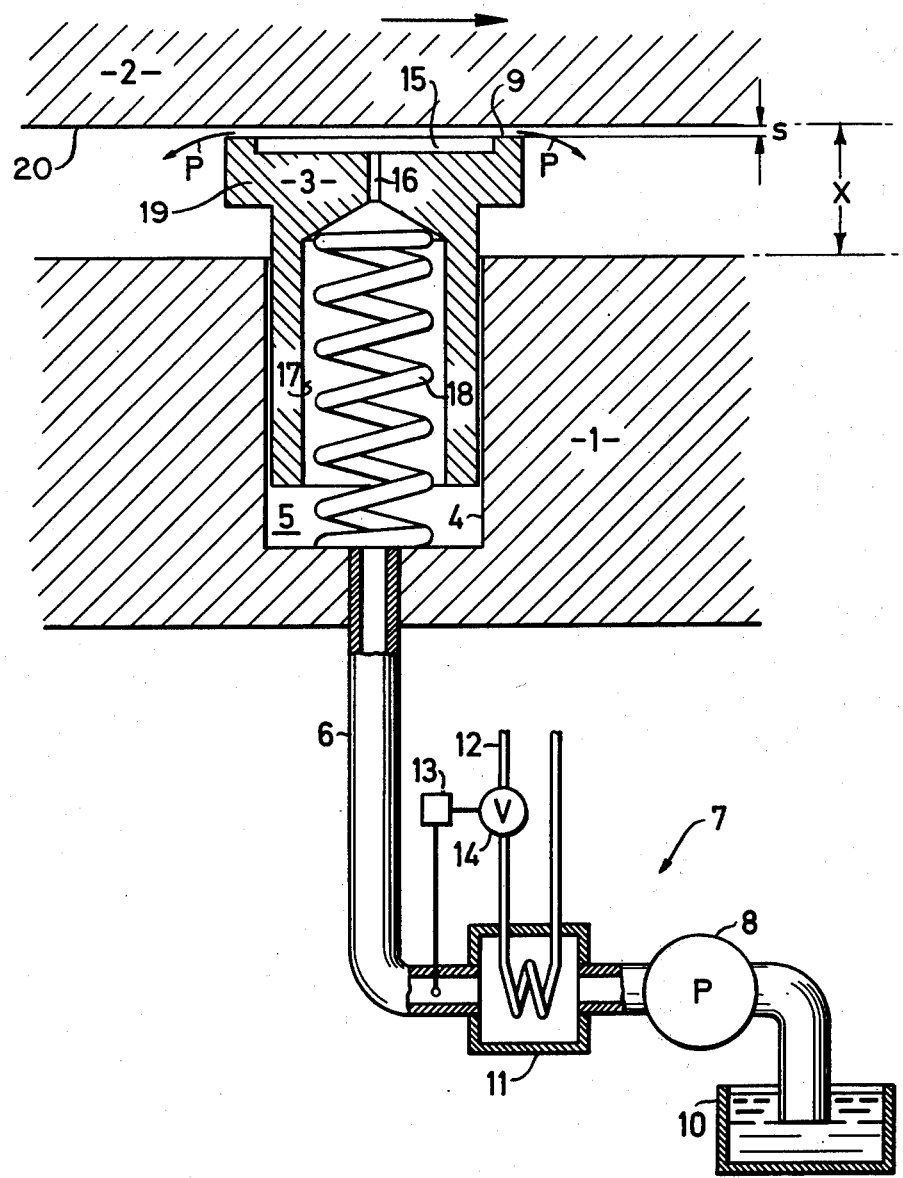
FIG. 1 is a diagrammatic representation of one form of apparatus in accordance with the invention.

In FIG. 1, reference character 1 identifies a load-carrying machine member, for example the bed of a machine. Reference character 2 identifies a member of that machine which is to be carried by the element 1 at a hydrostatically lubricated bearing, for motion of the element 2 with respect to the element 1 in a plane perpendicular to the plane of the figure and with freedom of motion between the elements 1 and 2 in the plane of the figure also.

The piston 3 is guided in a cylindrical cavity 4 of the machine member 1, with close clearance to the cavity walls which is shown exaggerated in FIG. 1. The cavity 4 thus defines a space 5 within the member 1 and beneath the piston 3, and this space is connected via a conduit 6 to a source of hydraulic fluid under pressure, generally indicated at 7. The source 7 includes a volumetric pump 8 which draws fluid such as oil from a reservoir 10 and delivers it at constant volume per unit time to the line 6. A cooler 11 is provided in the line 6. The cooler holds the hydraulic fluid at a constant temperature by means of a cooling coil 12 through which a coolant medium is delivered. To this end, a device 13 responsive to temperature in the line 6 downstream of the cooler 11 controls at a valve 14 the flow of coolant in line 12.

The piston 3 is provided, on the face turned toward the movable machine member 2 to be supported, with a hydrostatic lubricant-receiving cavity or pocket 15. The pocket 15 connects through a throttling bore 16 with the hollow interior 17 of the piston, which is open to the space 5. A helical compression spring 18 is disposed in this hollow space and is engaged between the member 1 and the underside of the crown 19 of the piston.

In operation, there exists a clearance S between the piston 3 and the machine member 2 which is being supported by the member 1. This clearance amounts in practice to a few hundredths of a millimeter. The hydraulic lubricant medium supplied to the cavity 15 passes out through this clearance in the manner indicated by the arrows P.

If for example, as is disclosed for the support pistons of U.S. Pat. No. 3,802,044, hydraulic fluid were supplied to line 6 at constant pressure, the effect of the spring 18 would be to increase the stress exerted upwardly by the piston as it is forced downwardly into its cylindrical cavity 4. The increase, however, would depend only on the spring. Hence the load-carrying capacity of the piston would be only the sum of the hydraulic stress exerted by the fluid (at constant pressure) on the underside of the piston plus the stress exerted by the spring.

If instead, as in the construction of FIG. 1, the source 7 of hydraulic fluid comprises a volumetric pump 8 which delivers fluid at a constant time rate, there will occur an amplification of the load-carrying capacity of the piston 3. As the machine part 2 approaches the part 1 in response to an increase in an applied force stressing parts toward each other normally of the surface 20, the piston will be driven down into a cavity 4, compressing the spring 18. As a result of this compression the stress exerted by the spring will be increased, and this will produce a reduction in the clearance S between the machine member 2 and the piston, or, more accurately, the sill 9 on the piston which surrounds the hydrostatic pocket 15. Reduction of the clearance S, however, effects a reduction in the rate of flow of fluid streaming out through that clearance (at the location of the arrows P). Hence the pressure rises in the space 5 beneath the piston, and this increases the upward hydraulic force on the piston. In this way, the stress exerted by the spring 18, which may be weak in and of itself, is effectively amplified.

The amount of this amplification, i.e. amplification factor which can be obtained in this way, is dependent on the ratio of the operative area $F_T$ of the cavity 15 to the projected area $F_0$ of the piston 3 which is exposed to the pressure existing in the space 5.

The amplification factor $m$ can then be computed as follows:

$$m = \frac{F_T}{F_T - F_0}$$

The amplification factor is hence subject to control in the design and dimensioning of the structure, and can readily take on values of the order of five to one hundred.

With an amplification factor of one hundred, a spring stress of one kilopond (i.e. a one kilogram force) thus results in an increase in load-carrying capacity for the piston of one hundred kiloponds. If the force by which the element 2 is stressed toward the element 1 normally of the surface 16 (i.e. vertically downward, in FIG. 1) is increased from one kilogram to 100 kilograms, the piston 3 will be forced down into cavity 4, thereby reducing the spacing of the parts 1 and 2. In addition, this spacing will be further diminished, although typically by a much smaller amount, by a reduction in the clearance S, the clearance S being inversely related to the third power of the force existing between the part 2 and the piston. Such a reduction can readily be accepted since in hydrostatic bearings relatively large clearances are always present.

If it is desired to have a progressive, i.e. non-linear relation between the spacing of the elements 1 and 2 and the force stressing them toward each other, it is sufficient to provide a spring having such a non-linear stress-strain characteristic.

Figure 2:
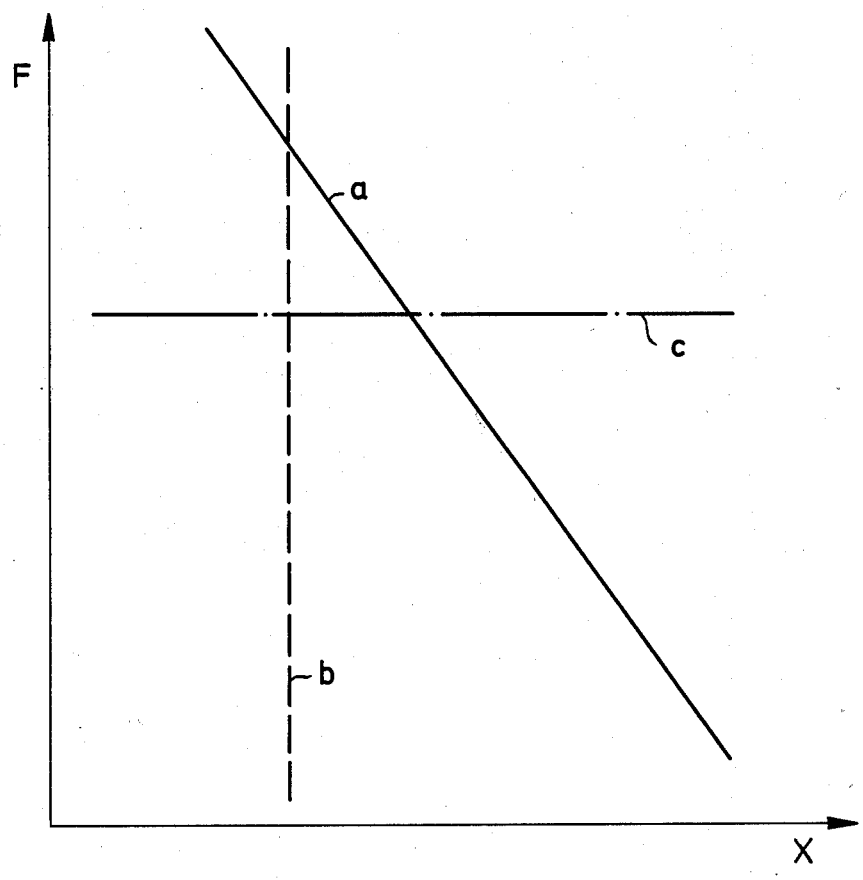
FIG. 2 is a graph useful in describing the operation of the invention.

FIG. 2 is a diagram of stress F versus space X on which the curve $a$ illustrates the operation of a support and bearing mechanism in accordance with the invention, curve $b$ illustrates the operation of the prior art fixed bearing of the type illustrated by Swiss Pat. No. 317,617, and curve $c$ illustrates the operation of a bearing and support mechanism of the prior art type shown in U.S. Pat. No. 3,802,044.

The device shown in FIG. 1 is operative if special steps are taken to insure that the bearing surface of the machine element 2 is always perpendicular to the axis of the cylindrical bore 4. If this is not assured, a construction of the type illustrated in FIG. 3 may advantageously be employed.

Figure 3:
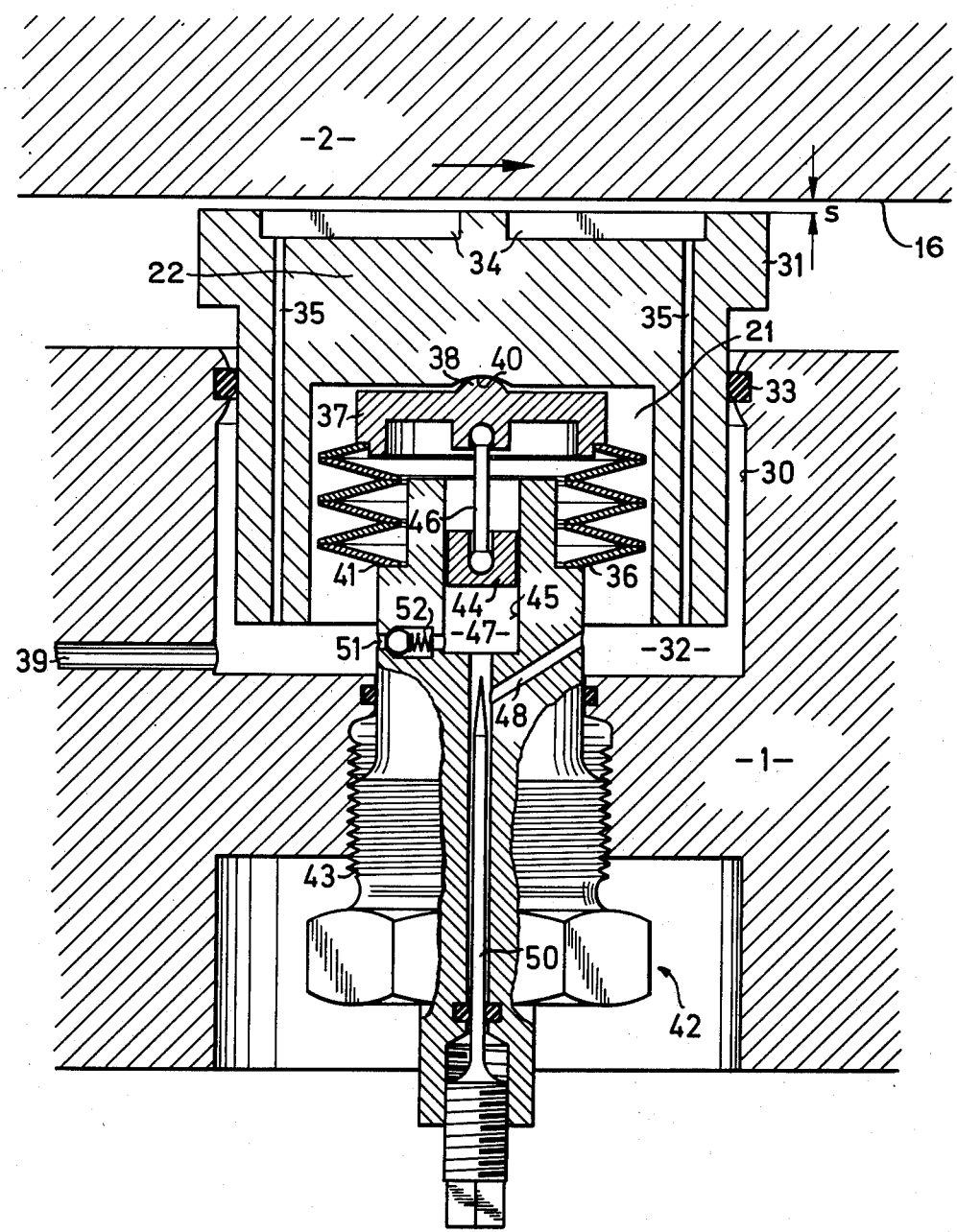
FIG. 3 is a sectional view of a hydrostatic bearing in accordance with the invention.

In the apparatus of FIG. 3 the stationary machine member 1 includes a cylindrical bore 30 of which the diameter is substantially larger than the outside diameter of the portion of the piston 31 which penetrates into that cylindrical bore. In order to seal the piston against the machine member 1 there is provided a seal 33, for example an O-ring. Since the piston 31 is not constrained to a vertical position in the cavity 30, it is provided at its upper face with four hydrostatic lubrication pockets 34, for example as disclosed in U.S. Pat. No. 3,802,044. These are connected to the space 32 beneath the piston through separate throttling passages 35. The space 32 connects via a passage 39 to a source of hydraulic fluid under pressure which may be of the type indicated at 7 in FIG. 1.

A compression spring 36 is disposed in the hollow cavity 21 of the piston between the crown 22 of the piston and the machine part 1. The spring may take as indicated the form of a plurality of shallow conical frusta, making up a structure resembling a bellows. The spring 36 bears at its upper end (as seen in FIG. 3) against a disk 37 which bears on the underside of the piston at a spherical surface 38 received in a cavity 40 in the underside of the piston crown. The other end of the spring 36 is supported on an annular surface 41 of a post or abutment 42 whose position in the machine member 1 can be adjusted at a threaded portion 43. By means of the post 42 the prestressed condition of the spring 36 may be adjusted for a given separation of the parts 1 and 2.

The support structure shown in FIG. 3 operates in the same manner as that shown in FIG. 1 with the difference that the piston 31 can undergo inclinations with respect to the machine member 1 and thereby conform itself to inclinations executed by the machine member 2, in particular the smooth surface 16 of member 2 parallel to which the members are to move with respect to each other. As a result, the clearance S will remain the same around the entire periphery of the piston under all conditions of operation.

The apparatus of the invention exhibits a damping effect upon oscillations of the machine member 2 with respect to the member 1. Upon approach of the member 2 to the member 1, fluid must be expelled from the cavities 34 and from the space 32 via reduced clearance S and/or the throttling passages 35. If the element 2 is shifted away from the machine element 1 additional hydraulic fluid must have an opportunity to flow in.

The damping operation of the device of the invention can however be substantially increased by the construction shown in FIG. 3.

The hydraulic damping mechanism of the embodiment of FIG. 3 incorporates a piston 44 which is received with close clearance in a bore 45 of the adjustable post 43. The piston 44 is coupled via a pin 46 with the disk 37. The piston 44 defines in the bore 45 a cylindrical space 47 beneath it which is connected by passage 48 with the cavity 32 beneath the main piston 31. The connection of the space 47 with the space 32 via the passage 48 can be adjusted by means of a needle valve 50.

Upon motion of the piston 31 in the bore 30, the piston 44 will simultaneously move upwardly or downwardly in the post 42. In this way hydraulic fluid is forced out of the space 47 or is drawn into it by suction. There is thereby effected a hydraulic damping. It is also possible to make the damping effective only for one direction of motion by providing a supplementary inlet passage 51 which leads into the cylindrical space 47 and which contains a check valve or one way valve 52.

The invention thus provides bearing apparatus to position one machine member, such as the member 2 of the drawing having a smooth surface 16, from another machine member such as the member 1 for relative motion of the two members parallel to that surface while permitting relative motion of those members normally of that surface in response to changes in stress pressing the members toward each other normally of that surface. This apparatus comprises a piston, such as the piston 3 of FIG. 1, received in a cavity 4 of the other member 1. The piston has a passage, such as the passage 16 of FIG. 1, extending from the exterior end face of the piston, i.e. the end face on which is formed in FIG. 1 the hydrostatic bearing pocket 15, to the end face of the piston exposed to the cavity in the member 1. In the embodiment of FIG. 1 the end face of the piston exposed to the cavity simply means the projected area of the piston on which the hydraulic fluid beneath the piston is active. The bearing apparatus of the invention further comprises resilient means, such as the spring 18 of FIG. 1, engaged between the piston 3 and the member 1, and means such as the pump 8 to deliver hydraulic fluid to the cavity 4 beneath the piston. Desirably, the pump 8 delivers fluid at a substantially constant time rate, and means such as the cooler 11 and control arrangement 12, 13 and 14 of FIG. 1 on coolant flow may be provided to regulate the temperature of the fluid delivered by the pump.

In one preferred embodiment of the invention illustrated in FIG. 3, the cavity in the member 1 in which the piston (31 in that figure) is received is of greater diameter than the piston over at least a portion of the height of that cavity, indicated at 30 in FIG. 3, and means such as an O-ring 33 are provided to seal the piston 31 to the walls of the cavity 30 exteriorly of the portion thereof of such greater diameter. As shown in each of FIGS. 1 and 3, the piston may have one or more cavities or pockets formed in the exterior face thereof to form a hydrostatically lubricated bearing surface between the piston and the one machine member 2. As indicated in each of FIGS. 1 and 3, the piston is desirably formed with a hollow beneath the crown thereof with the hollow exposed to the cavity and with the resilient means engaged between the underside of the piston crown and the other member 1 where it may bear against an adjustable abutment such as the post 42 of FIG. 3.

When the cavity in the other member 1 for receipt of the piston is made oversized in diameter in its lower portion, as illustrated in FIG. 3, and when the piston is hollow beneath a crown, as likewise illustrated in FIG. 3, the sealing means such as the O-ring 33 between the piston and that other member desirably engage the exterior side surface of the piston substantially at the location axially of the piston where the spring (36 in FIG. 3) engages with the piston -- with the help of a disk 37 in FIG. 3. FIG. 3 also shows in the smaller piston 44, bore 47 in the post 42 and in the passage 48 means to damp the motions of the main piston with respect to the other member 1 in whose cavity it is received.

While the invention has been described hereinabove in terms of a number of presently preferred exemplary embodiments thereof, the invention itself is not limited thereto but rather comprehends all modifications of and departures from those embodiments properly falling within the scope of the appended claims.

I claim:

1. Bearing apparatus to position one machine member having a smooth surface from another machine member for relative motion of the two members parallel to that surface while permitting relative motion thereof normally of that surface in response to changes in stress pressing the members toward each other normally of that surface, said apparatus comprising a piston having inner and outer end faces with said outer end face having a greater cross sectional area than said inner end face, said other member having a cylindrical cavity formed therein, said piston being partially received in said cavity in sealing relation therewith for motion with respect to said other member and with said inner face in said cavity, said piston having a throttling passage extending therethrough from the inner end face thereof exposed to said cavity to the outer end face thereof, said outer end face having at least one hydrostatic fluid-receiving cavity formed therein and communicating with said passage, resilient means engaged between said piston and said other member, and means to deliver hydraulic fluid to said cylindrical cavity at a substantially constant time rate, whereby said resilient means will be compressed in response to increase stress urging said members together normally of said smooth surface with consequent reduction in the clearance between said other end face of the piston and said smooth surface and with resultant increase in the hydraulic force exerted by said fluid on the inner end face of said piston.

2. Bearing apparatus according to claim 1 including means to regulate the temperature of said fluid.

3. Bearing apparatus according to claim 1 wherein said cavity is over at least a portion of its height of greater diameter than said piston, said apparatus including means to seal said piston to the walls of said cavity exteriorly of said portion.

4. Bearing apparatus according to claim 1 wherein said piston includes a crown and a skirt surrounding a hollow beneath said crown, said hollow being exposed to said cavity, and wherein said resilient means extend substantially from the underside of said crown to engagement with said other member.

5. Bearing apparatus according to claim 4 further including an abutment adjustably arranged in said one member for receipt of one end of said resilient means.

6. Bearing apparatus according to claim 4 wherein said cavity is over at least a portion of its height of greater diameter than said piston, said apparatus including means to seal said piston to the walls of said cavity exteriorly of said portion and wherein said sealing means engage the exterior side surface of said piston substantially at the location axially of said piston of the engagement of said resilient means with said piston.

7. Bearing apparatus according to claim 1 further comprising hydraulically operated means to damp the motions of said piston with respect to said other member.

* * * * *